2,860,051
FOOD COMPOSITION

Willard A. Krehl, New Haven, Conn., and Blake Snyder, Caldwell, N. J., assignors to Howard B. Bishop No Drawing. Application April 21, 1954
Serial No. 424,769

1 Claim. (Cl. 99—54)

This invention relates to a food useful as such or as a dietary supplement under various physiological conditions.

The desirability of supplementing the diet of a large part of the earth's total population is widely recognized. There is recognized also the need of calcium and protein supplementation of the diet for many persons, even in the United States. It is understood, for example, that an increased calcium intake is important for aged humans and that in growing children both increased calcium and protein intakes are important.

This invention provides a foot that, when mixed with milk, constitutes practically a complete well balanced diet of high protein content and with a satisfactory calcium content. It provides also a palatable food from which there is unusually high assimilation of the total calcium content.

Briefly stated, the invention comprises a food composition containing a major proportion of proteins, a normally substantially insoluble, non-toxic calcium compound and a metabolic solubilizing or assimilation increasing agent for the calcium compound, the said agent being nucleic acid in the proportion of at least 0.3 part for 100 parts of the food composition. The invention comprises also a food of the kind described containing a minor proportion of an edible wetting agent.

The use of our food composition has been marked by an absence of digestive disturbances or allergic reactions. It has been used with success in formulas for babies and as an ingredient of milk beverages in which the particles of the supplement remain suspended for a day or so.

Representative ranges of proportions of the various components of the food composition follow.

| | Percent |
|---|---|
| Proteins | 50–70 |
| Lactose or other sugar | 20–35 |
| Hydrolyzed bone meal | 1–10 |
| Minerals (ash) other than calcium | 3–9 |
| Yeast containing at least 5% of nucleic acids | 6–10 |
| Vitamins, minerals, miscellaneous enrichments, and moisture to make 100%. | |

As to materials used, the calcium compound is solid, insoluble, non-toxic, and impalpable in form. Examples of materials that meet the requirements are hydrolyzed bone meal, secondary calcium phosphate, calcium carbonate, and the calcium content of milk. The steamed bone meal is particularly satisfactory for the present purpose.

The source of nucleic acids used in connection with the solubilizing of the calcium compound or otherwise improving the assimilability of it may be in the form of nucleic acids or nucleoproteins. Such proteins during metabolism form nucleic acids. Examples of a satisfactory source of nucleic acids are specially grown high-nucleic-acid yeasts known to contain at least 5% of nucleic acids and ordinarily 5%–7%, Bee Flex 3–6 or Hi Dee yeast, the latter being an irradiated dry yeast.

The proteins used are those in which the essential amino acids are at least reasonably well balanced for human consumption. Examples that illustrate the class are milk, soya, particularly degraded soya protein that is soluble or dispersible in water, and meat proteins. The milk proteins are particularly satisfactory in the balance of these amino acids and in giving with our supplement a palatable and highly nutritious product. We use milk solids in spray dried or other convenient form and fortify them with additional casein and lactalbumin in amount to make the proportion of proteins at least about 2 parts to 1 of lactose, the casein and lactalbumin being added to advantage in the ratio in which they occur in milk. Such addition of casein and lactalbumin is necessary to give the high protein content of our food composition. The proportion of nucleic acids free or combined or both should correspond to at least 3 parts for 100 of the calcium compounds and at least 0.2 for 100 of the whole composition.

To improve the suspendability in aqueous fluids, we incorporate a permitted and necessarily non-toxic suspending agent of which Seakem (alginic acid or sodium alginate), ethylene oxide derivative of a partial ester of sorbitol with oleic acid (such as Spans or Tweens), and glycerine monostearate are examples. The alginate type of compound is one that is ordinarily used in the present invention because it gives also some slight thickening effect which improves the non-settling feature of the composition when suspended in water.

The other components of the composition which are present in minor proportion by weight will be illustrated in connection with the examples.

Once the effect of the nucleic acids in increasing the assimilation of calcium in animal nutrition has been discovered, various theories may be advanced to explain the mechanism by which the increasing assimilation is achieved. We consider that an important part of the effect is due to the increase in the solubility of normally insoluble calcium compounds such as the calcium phosphates.

In fortifying milk proteins with casein and lactalbumin, we mix milk with casein and lactalbumin representing skim milk less the lactose, and then subject the whole to spray drying. The proportion of the casein and lactalbumin so introduced is sufficient to make the total protein content of the mixture to be spray dried at least about 2 parts to 1 part of lactose.

In one embodiment of the invention, we introduce also the other components including the yeast of high nucleic acid content, the wetting agent, and the components used in minor proportions by weight. The whole is then spray dried together or otherwise reduced to commercially dry condition in one operation.

If other form of drying is used and the drying step does not yield a powder directly, then the dried material is subjected to suitable milling to reduce the composition to a relatively fine powder or flour form.

The invention will be further illustrated by detailed description in connection with the following specific examples of the practice of it. Proportions here and elsewhere herein are expressed as parts by weight unless otherwise stated.

EXAMPLE 1

24 parts of milk proteins, 28 parts of lactose, and 33.5 parts casein and lactalbumin in dried, powder form, are mixed with 6 parts of yeast containing 6% of nucleic acids in the form of the nucleoproteins. Other ingredients are added in conventional form and in amount required to make the whole, on the water free basis, have the following analysis shown in the following table, the metals being calculated as oxides and the riboflavin, thiamine, and vitamin D being supplied to advantage in part at least by special yeasts known to be good sources of those vitamins, in addition to the 6% of high-nucleic-acid yeast.

*Proximate analysis—dry basis*

| Ingredient | Percent |
|---|---|
| Milk proteins | 57.5 |
| Lactose | 28.0 |
| Yeast containing at least 6% of nucleic acids | 6.0 |
| Steamed bonemeal | 2.0 |
| Other ash | 4.0 |
| Milk fat | 1.4 |
| Maltose dextrine sugars | 1.1 |
| Total | 100 |

*Approximate vitamin and mineral contents of 100 grams*

| Ingredient | Ratio to adult minimum daily requirements |
|---|---|
| Thiamine, 2.0 mg | 2.0 times. |
| Riboflavin, 4.3 mg | 2.0 times. |
| Niacin, 11.5 mg | 1.1 times. |
| Vitamin D, 1,000 I.U. | 1.3 times. |
| Iron, 13.0 mg | 1.3 times. |
| Phosphorus, 1,160.0 mg | 1.5 times. |
| Sodium, 0.45 gm | |
| Potassium, 0.8 gm | |
| Chlorides, 0.08 gm | |
| Carbonate, .0 to a trace | |
| Pantothenic acid, 2.5 mg | |
| Pyridoxine, .3 mg | |
| Folic acid, 1.0 mg | |
| B$_{12}$, 5.0 mcg | |
| Copper, 1.5 mg | |
| Manganese, 0.15 mg | |

EXAMPLE 2

The procedure and formula of Example 1 are used except that the milk proteins and added casein and lactalbumin are replaced by an equal weight of soya proteins emulsified in water and the lactose by an equal weight of sucrose.

EXAMPLE 3

The procedure and formula of either Example 1 or 2 are used, except that the steamed bonemeal is replaced by an equivalent weight, from the standpoint of calcium, of secondary calcium phosphate or precipitated calcium carbonate and the yeast is replaced by 0.3 gram of nucleic acid.

It will be understood that it is intended to cover all changes and modifications of the examples of the invention herein chosen for the purpose of illustration which do not constitute departures from the spirit and scope of the invention. It will be understood also that the procedure of Example 1 may be modified by supplying milk proteins and lactose in the form of fluid skim milk, admixing the other ingredients in whole or in part, and spray drying the resulting mix, any ingredients not introduced before spray drying being incorporated later.

What we claim is:

A food composition consisting essentially of an intimate mixture of 50–70 parts by weight of a protein selected from the group consisting of milk and soya proteins, 1–10 parts of a finely divided water-insoluble non-toxic calcium compound, and 6–10 parts of a dry yeast of nucleic acid content at least 5%.

References Cited in the file of this patent

UNITED STATES PATENTS

| | | |
|---|---|---|
| 612,561 | Dodd | Oct. 18, 1898 |
| 1,706,564 | Dawson | Mar. 26, 1929 |
| 1,859,250 | Bertel | May 17, 1932 |
| 2,310,383 | Andrews et al. | Feb. 9, 1943 |
| 2,407,027 | Mason et al. | Sept. 3, 1946 |
| 2,422,486 | Johnston | June 17, 1947 |
| 2,657,142 | Peebles et al. | Oct. 27, 1953 |

OTHER REFERENCES

Associates of Rogers, Fundamentals of Dairy Science, New York, 1928, pp. 466 to 469.

Pigman et al.: Chemistry of the Carbohydrates, New York, 1948, pp. 396 to 399.